United States Patent
Krane et al.

(10) Patent No.: US 7,574,456 B2
(45) Date of Patent: Aug. 11, 2009

(54) BIDIRECTIONAL UPDATE OF CLIENT-SERVER OBJECTS

(75) Inventors: Rolf Krane, Wiesloch (DE); Rudolf Niessen, Rauenberg (DE)

(73) Assignee: SAP AG, Walldorf (DE)

( * ) Notice: Subject to any disclaimer, the term of this patent is extended or adjusted under 35 U.S.C. 154(b) by 330 days.

(21) Appl. No.: 11/015,613

(22) Filed: Dec. 16, 2004

(65) Prior Publication Data

US 2006/0136445 A1     Jun. 22, 2006

(51) Int. Cl.
 *G06F 17/30* (2006.01)
(52) U.S. Cl. .............................. 707/200; 707/8; 707/9; 707/10; 709/219; 709/203; 709/200; 719/313
(58) Field of Classification Search ................ 707/204, 707/200, 8, 9, 10; 709/203, 219, 200; 719/313
See application file for complete search history.

(56) References Cited

U.S. PATENT DOCUMENTS

| | | | | |
|---|---|---|---|---|
| 5,734,898 A | * | 3/1998 | He ............................. | 707/203 |
| 5,761,678 A | * | 6/1998 | Bendert et al. ............. | 707/204 |
| 5,829,001 A | * | 10/1998 | Li et al. ...................... | 707/10 |
| 5,920,725 A | * | 7/1999 | Ma et al. .................... | 717/171 |
| 6,202,085 B1 | * | 3/2001 | Benson et al. .............. | 709/205 |
| 6,226,650 B1 | * | 5/2001 | Mahajan et al. ............ | 707/201 |
| 6,317,754 B1 | * | 11/2001 | Peng .......................... | 707/203 |
| 6,615,253 B1 | * | 9/2003 | Bowman-Amuah ........ | 709/219 |
| 6,636,897 B1 | * | 10/2003 | Sherman et al. ............ | 709/248 |
| 6,678,700 B1 | * | 1/2004 | Moore et al. ................ | 707/200 |
| 2002/0023113 A1 | * | 2/2002 | Hsing et al. ................. | 707/513 |
| 2005/0027755 A1 | * | 2/2005 | Shah et al. .................. | 707/201 |
| 2005/0223117 A1 | * | 10/2005 | Terry et al. ................. | 709/248 |

* cited by examiner

*Primary Examiner*—Hosain T Alam
*Assistant Examiner*—Syling Yen
(74) *Attorney, Agent, or Firm*—Finnegan, Henderson, Farabow, Garrett & Dunner, LLP

(57) ABSTRACT

Methods and apparatus, including computer program products, for updating data. In one aspect, a system that has a server operating on a structure of server data objects and a client operating on a structure of client data objects, the data objects and the structure of the server data objects and the structure of the client data objects being managed through an implementation of a predefined application programming interface that implements at least two types of data object update commands, the data object update commands being operable to perform bidirectional updates between the server data objects and the client data objects. The two types of data object update commands are: an object level update type that is operable to update one or more specified data objects; and a sub-structure level update type that is operable to update a sub-structure of the data objects.

19 Claims, 3 Drawing Sheets

BIDIRECTIONAL UPDATE OF CLIENT-SERVER OBJECTS

BACKGROUND

The present invention relates to data processing by digital computer, and more particularly to bidirectional update of data objects in a client-server system.

A client-server system typically divides processing and data storage between two separate but linked applications—a client application and a server application. The client application running on the client system present a user interface to the user, enables the user to request data from the server, and presents the requested data to the user. The server application receives data requests from multiple users interacting with multiple client applications. The server application processes the data requests received from multiple clients, and retrieves the requested data. The client-server system can include one or more clients, and the server can be implemented as a centralized server or as one or more distributed servers.

Different types of client-server systems result from different approaches to dividing the processing and data storage between the client and the server. In one type of client-server system, the client application only provides the user interface to the user and all the processing and data storage required for responding to user requested operations is provided by the server application. In this type of client application, the client typically does not store any data required by the client application and all data requests from the client application are transmitted to the server. In an alternative type of client-server application, the client application provides data storage and processing required to respond to the user requested operations, in addition to providing the user interface. In this type of client-server application, data required by the client application is stored at the client and the client can respond to data requests without having to request data from the server.

SUMMARY OF THE INVENTION

In general, in one aspect, the invention features a system that has a server operating on a structure of server data objects and a client operating on a structure of client data objects, the data objects and the structure of the server data objects and the structure of the client data objects being managed through an implementation of a predefined application programming interface that implements at least two types of data object update commands, the data object update commands being operable to perform bidirectional updates between the server data objects and the client data objects. The two types of data object update commands are: an object level update type that is operable to update one or more specified data objects; and a sub-structure level update type that is operable to update a sub-structure of the data objects.

The invention can be implemented to include one or more of the following advantageous features. The system also includes a server protocol controller operable to receive one or more modifications to the structure of server data objects in response to a server operation, the server protocol controller transmitting to the client an update command of either the object level update type or the sub-structure level update type to update the structure of client data objects with the modifications to the structure of server data objects, the server protocol controller determining whether to transmit the object level update type or the sub-structure level update type command based on predefined criteria at the server.

The system also includes a client protocol controller operable to receive one or more modifications to the structure of client data objects in response to a server operation, the client protocol controller transmitting to the server an update command of either the object level update type or the sub-structure level update type to update the structure of server data objects with the modifications to the structure of client data objects, the client protocol controller determining whether to transmit the object level update type or the sub-structure level update type command based on predefined criteria at the client.

The client and server implement a data object model, the data object model defining a data structure for representing structure of the server data objects and the structure of the client data objects, the data object model further defining an interface for operating on the data objects and the structure of the server data objects and the structure of the client data objects.

The data objects represent user interface elements, and the data object model is a user interface object model. The data objects represent data types, and the object model is a data type object model. The data object model is an XML document object model.

In general, in another aspect, the invention features a computer program product, tangibly embodied in an information carrier, with instructions operable to receive one or more modifications to a structure of server data objects and to transmit a data object update command to a client, the data object update command being operable to update a structure of client data objects with the modifications to the structure of server data objects, the data objects and the structure of client data objects being managed through an implementation of a predefined application programming interface that implements at least two types of data object update commands, the data object update commands being operable to update the client data objects with the server data objects, wherein the two types of data object update commands are: an object level update type that is operable to update one or more specified data objects, and a sub-structure level update type that is operable to update a sub-structure of the data objects.

In general, in another aspect, the invention features a computer program product, tangibly embodied in an information carrier, the computer program product comprising instructions operable to cause data processing apparatus to receive one or more modifications to a structure of client data objects and transmit a data object update command to a server, the data object update command being operable to update a structure of server data objects with the modifications to the structure of client data objects, the data objects and the structure of server data objects being managed through an implementation of a predefined application programming interface that implements at least two types of data object update commands, the data object update commands being operable to update the server data objects with the client data objects.

In general, in another aspect, the invention features a method including the actions of receiving one or more modifications to a structure of server data objects; and transmitting a data object update command to a client, the data object update command being operable to update a structure of client data objects with the modifications to the structure of server data objects, the data objects and the structure of client data objects being managed through an implementation of a predefined application programming interface that implements at least two types of data object update commands, the data object update commands being operable to update the client data objects with the server data objects.

In general, in another aspect, the invention features a method including the actions of receiving one or more modifications to a structure of client data objects; and transmitting a data object update command to a server, the data object update command being operable to update a structure of server data objects with the modifications to the structure of client data objects, the data objects and the structure of server data objects being managed through an implementation of a predefined application programming interface that implements at least two types of data object update commands, the data object update commands being operable to update the server data objects with the client data objects.

The invention can be implemented to realize one or more of the following advantages. Updates between the client data objects and the server data objects are performed automatically by the protocol commands. The client application and server application are not required to implement operations for performing updates between the client data objects and the server data objects. The client and server can optimize the performance of the client-server system by selecting the type of protocol command used to perform the update operations, i.e., the object level update type command or the sub-structure level update type command. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
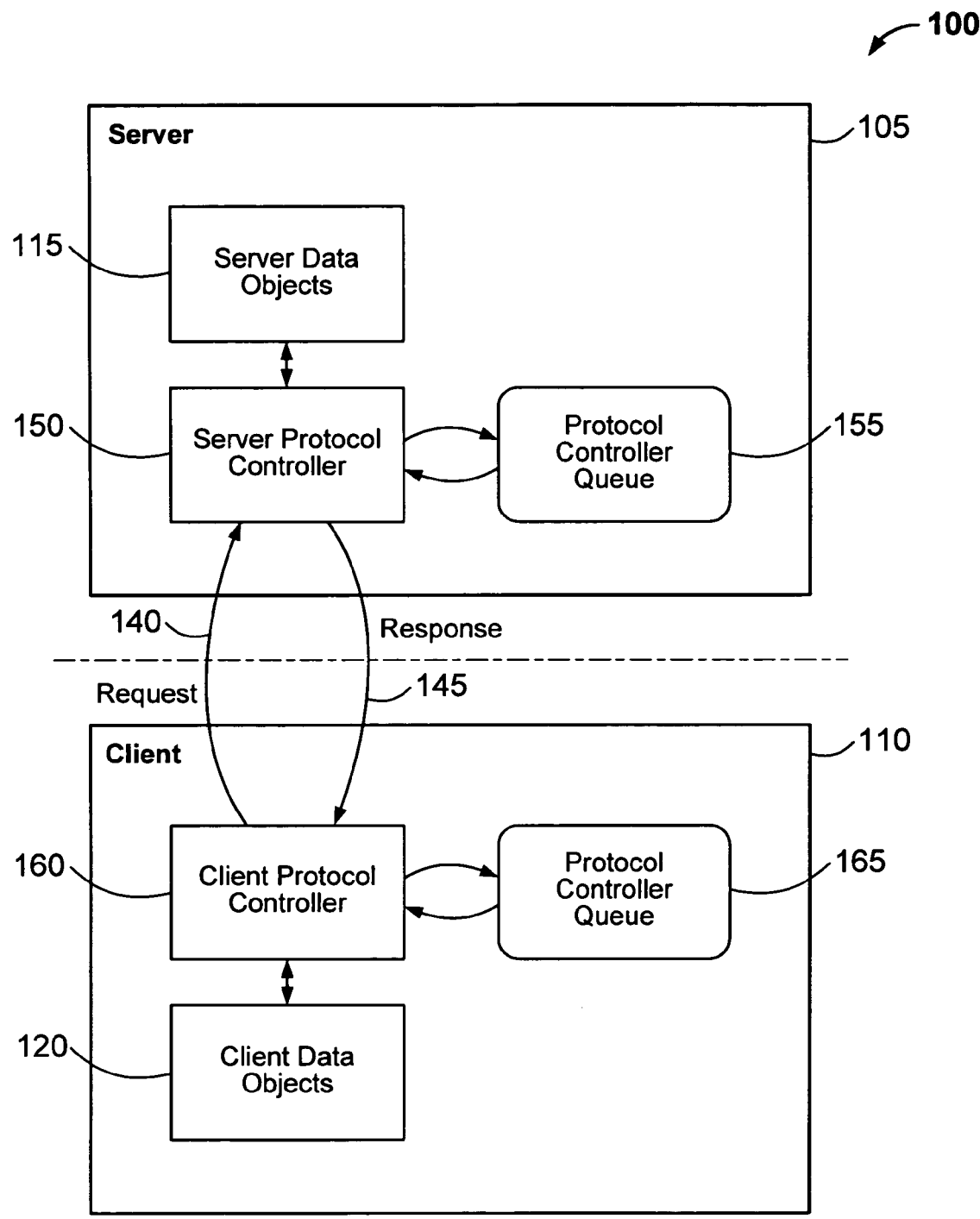
FIG. 1A illustrates a client-server system implementing a communication protocol for performing bidirectional updates.

The systems and techniques described here can be implemented in client-server system 100 illustrated in FIG. 1A that includes a server 105 and a client 110. The server 105 operates on a hierarchical structure of server data objects 115, and the client 110 operates on a hierarchical structure of client data objects 120. Initially, the structure of client data objects 120 is a copy of the structure of server data objects 115. The server 105 and the client 110 implement a communication protocol for performing bidirectional updates between the client data objects 120 and the server data objects 115. The communication protocol specifies protocol commands that can be used to update the structure of server data objects 115 with modifications made to the structure of client data objects 120, and to update the structure of client data objects 120 with modifications made to the structure of server data objects. The communication protocol is implemented at the server 105 by a server protocol controller 150, and at the client 110 by a client protocol controller 160. The server can include a protocol controller queue 155 that is used to queue protocol commands that are to be transmitted from the server to the client. Similarly, the client can include a protocol controller queue 165 that is used to queue protocol commands to be transmitter from the client to the server.

The communication protocol specifies two types of data object update commands for performing bidirectional updates between the structure of server data objects 115 and the structure of client data objects 120—an object level update command, and a sub-structure level update command. An object level update command is used to update one or more specified data objects. A sub-structure level update command is used to update a sub-structure of the structure of data objects. The sub-structure level update commands include commands to replace the sub-structure of data objects with a modified sub-structure of data objects, delete a sub-structure of data objects, and merge two or more sub-structures of data objects.

If the server data objects 115 are modified as a result of operations performed at the server, the server generates the protocol commands to be transmitted to the client in order to update the client data objects 120. The server protocol controller 150 transmits the generated protocol commands to the client. The server selects the type of protocol command to be generated, i.e., an object level update command or a sub-structure level update command, based on predefined criteria. The predefined criteria evaluated by the server can include the bandwidth required to transmit the protocol commands, and the number of operations that must be performed at the client to process the transmitted protocol commands, and the number of operations that must be performed at the server to produce the type of protocol command.

Similarly, if the client data objects 120 are modified as a result of operations performed at the client, the client generates the protocol commands to be transmitted to the server in order to update the server data objects 115. The client protocol controller 160 transmits the generated protocol commands to the server. The client selects the type of protocol command to be generated, i.e., an object level update command or a sub-structure level update command, based on predefined criteria. The predefined criteria evaluated by the client can include the bandwidth required to transmit the protocol commands, the number of operations that must be performed at the server to process the transmitted protocol commands, and the number of operations that must be performed at the client to produce the type of protocol commands.

Figure 1B:
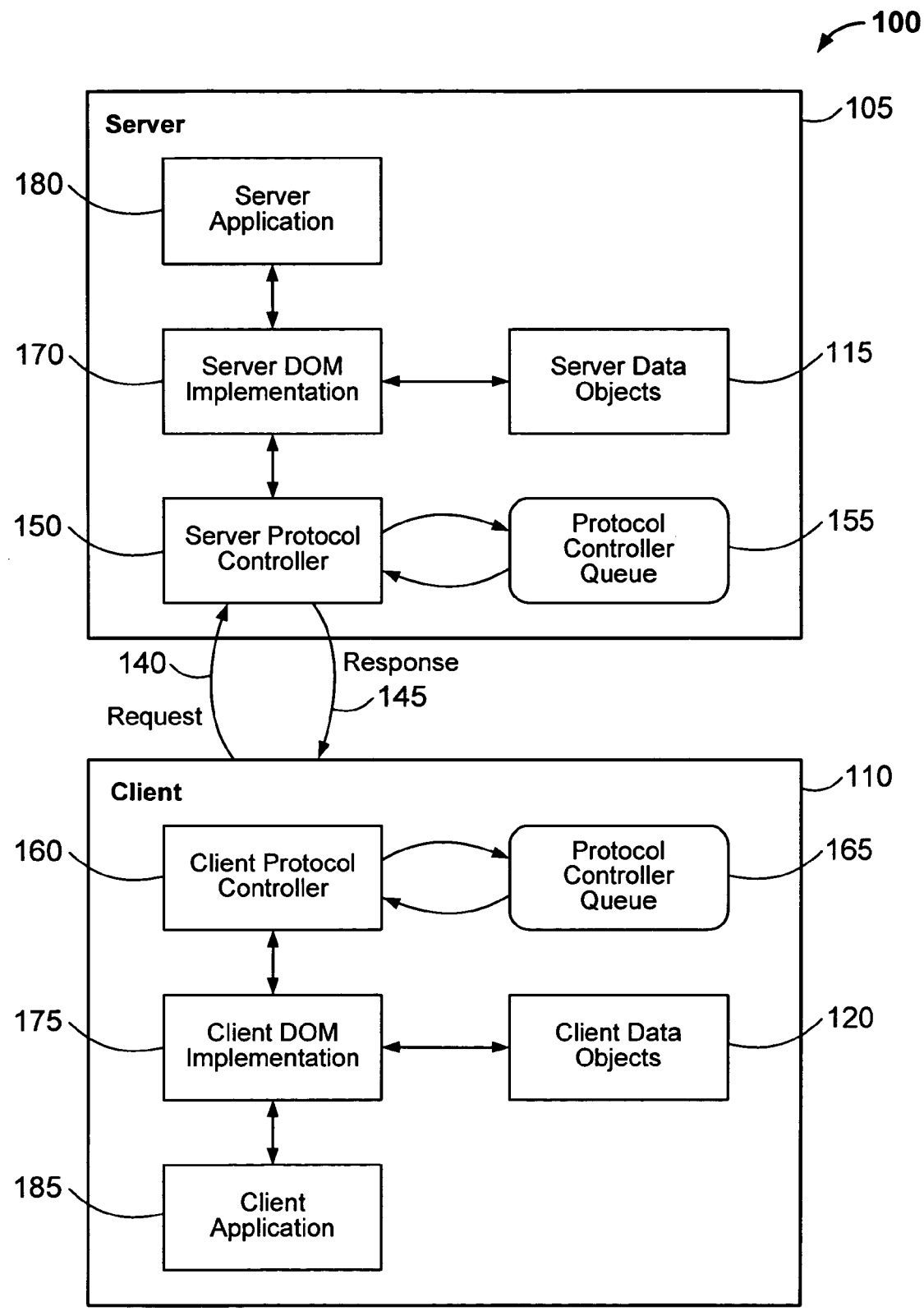
FIG. 1B illustrates an alternative client-server system implementing a document object model.

FIG. 1B illustrates an alternative client-server system 100, where the client and the server include client include a data object model implementation (a DOM or DOM implementation). The DOM defines a standard programming interface for interacting with data objects, i.e., the server data objects 115 and the client data objects 120, a standard model of how to operate on the data objects, and a standard interface for accessing and manipulating the data objects. The client and the server can use the same DOM implementation or they can implement different ones. The client implementation of the DOM 175 stores the client data objects 120. A client application 185 operates on the client data objects 120 using the client DOM interface functions provided by the client DOM implementation 175. If the client application 185 modifies the client data objects 120, the client DOM implementation 175 generates the protocol commands, i.e., the object level update commands or the sub-structure level update commands or both, required to update the server data objects 115. The client DOM implementation 175 selects the type of protocol command to be generated based on predefined criteria. Similarly, the server DOM implementation 170 stores the server data objects 115. A server application 180 operates on the server data objects 115 using the server DOM interface functions provided by the server DOM implementation 170. If the server application 180 modifies the server data objects 115, the server DOM implementation 170 generates the protocol commands required to update the client data objects 120, i.e., object level update commands or sub-structure level update commands. The server DOM implementation 170 selects the type of protocol command to be generated based on predefined criteria.

Figure 2:
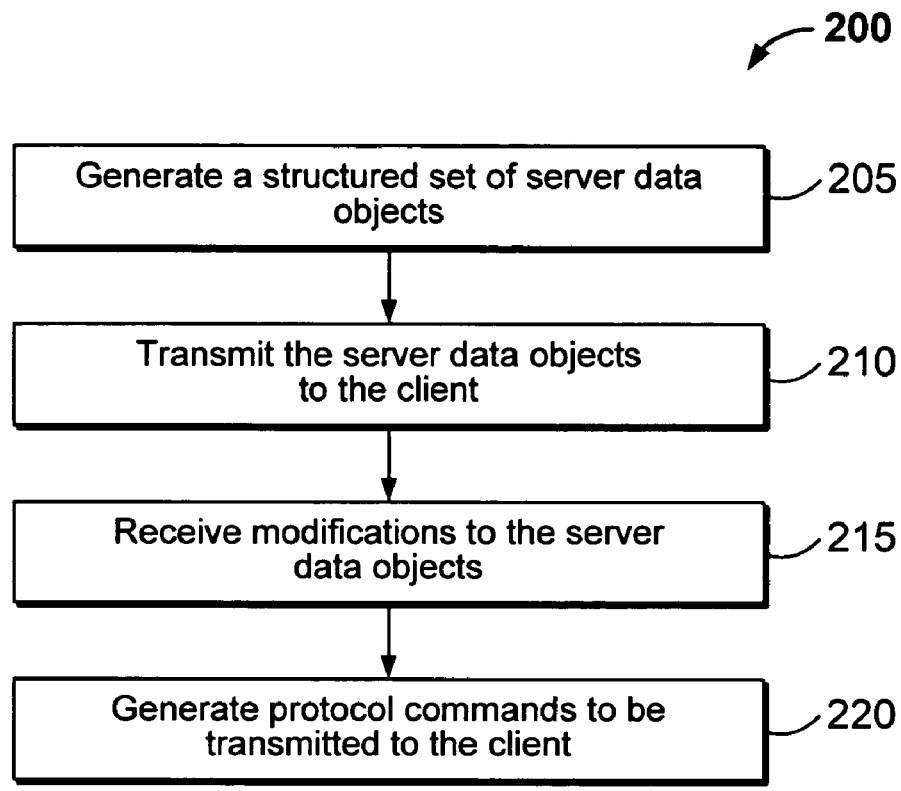
FIG. 2 is a flow diagram illustrating the communication protocol at the server.

FIG. 2 is a flow diagram illustrating a method 200 for implementing the communication protocol at a server. The server generates a structured set of server data objects that are stored at the server (step 205). The server transmits the structured set of server data objects to a client (step 210). The client stores the transmitted data as a structured set of client data objects. The server receives, from time to time, modifications to be made to the structured set of server data objects (step 215), and generates protocol commands to be transmitted to the client (step 220) in order to update the structure of client data objects. The protocol commands generated by the server include only object level update commands and sub-structure level update commands. The server determines the type of protocol commands to be transmitted to the client.

Figure 3:
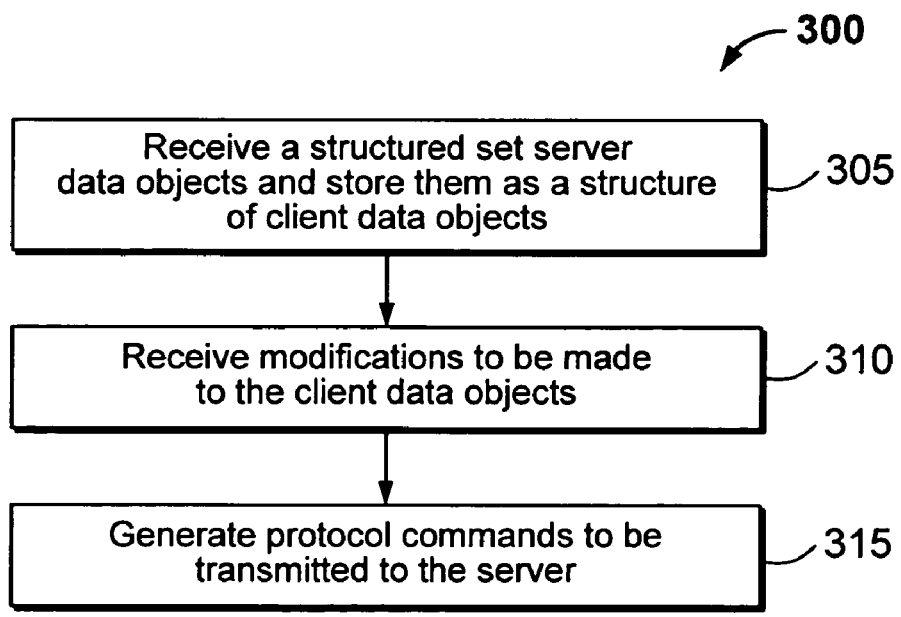
FIG. 3 is a flow diagram illustrating the communication protocol at the client.

FIG. 3 is a flow diagram illustrating a method 300 for implementing the communication protocol at a client. The client receives a structured set of server data objects and stores them as a structure of client data objects at the client (step 305). The client later receives modifications to be made to the client data objects (step 310), e.g., modifications generated as a result of user input received by a client application or otherwise as a result of applications running at the client. In response to such modifications, the client generates protocol commands to be transmitted to the server (step 315) in order to update the server data objects. The protocol commands generated by the client include only object level update commands and sub-structure level update commands. The client determines the type of protocol commands to be transmitted to the server in order to update the server data objects.

In one implementation, the data objects are user interface (UI) elements structured as a UI tree that specifies relationships between the UI elements. In an alternative implementation, the data objects represent different data types, and their hierarchical arrangement specifies the relationship between the data types, one or more values for each data type, and one or more attributes for each data type. The interface functions provided by the DOM implementations at the client and the server can include interface function that are used to manage individual data objects, e.g., values or attributes of individual data objects. The interface provided by the DOM implementations can also include interface functions that are used to manage the hierarchical structure, e.g., replace an entire sub-structure with a specified sub-structure, delete an entire sub-structure from the hierarchical structure, and merge two or more sub-structures in the hierarchical structure.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. Other embodiments are within the scope of the following claims

What is claimed is:

1. A computer-implemented hardware system including a processor, the system comprising:

a server using the processor to operate on a structure of server data objects and a client operating on a structure of client data objects, the server data objects, the client data objects, the structure of the server data objects, and the structure of the client data objects being managed through an implementation of a predefined application programming interface that implements at least two types of data object update commands, wherein the two types of data object update commands are:

an object level update type for performing bidirectional updates between the server data objects and the client data objects for updating an entire specified client data object or an entire specified server data object; and a sub-structure level update type for performing bidirectional updates between the server data objects and the client data objects for updating a sub-structure of a specified client data object or a specified server data object, the sub-structure being a subset of the specified client data object or the specified server data object; and a server protocol controller performing the steps of:
receiving one or more modifications to the structure of server data objects in response to a server operation,
determining, using the processor at the server, whether to transmit the object level update type command or the sub-structure level update type command based on a comparison of a predefined criteria and transmission requirements of the one or more modifications to the structure of server data objects, and
transmitting, based on the determination, an update command of either the object level update type or the sub-structure level update type to update the structure of client data objects with the modifications to the structure of server data objects.

2. The system of claim 1, wherein the server protocol controller transmits the update command of either the object level update type or the sub-structure level update type to the client.

3. The computer-implemented hardware system of claim 1, wherein the client protocol controller transmits the update command of either the object level update type or the sub-structure level update type to the server.

4. The computer-implemented hardware system of claim 1, wherein:
the client and server use the processor to implement a data object model, the data object model defining a data structure for representing the structure of the server data objects and the structure of the client data objects, the data object model further defining an interface for operating on the data objects and the structure of the server data objects and the structure of the client data objects.

5. The computer-implemented hardware system of claim 4, wherein the data objects represent user interface elements, and the data object model is a user interface object model.

6. The computer-implemented hardware system of claim 4, wherein the data objects represent data types, and the object model is a data type object model.

7. The computer-implemented hardware system of claim 4, wherein the data object model is an XML document object model.

8. A computer program product, tangibly embodied in a computer-readable hardware medium, the computer program product comprising instructions for causing a processor to:
receive, at the processor, one or more modifications to a structure of server data objects; and
transmit, from the processor, a data object update command to a client, the data object update command for updating a structure of client data objects with the modifications to the structure of server data objects, the client data objects and the structure of client data objects being managed through an implementation of a predefined application programming interface that implements at least two types of data object update commands, wherein the two types of data object update commands are:

an object level update type for performing bidirectional updates between the server data objects and the client data objects for updating an entire specified client data object or an entire specified server data object; and a sub-structure level update type for performing bidirectional updates between the server data objects and the client data objects for updating a sub-structure of a specified client data object or a specified server data object, the sub-structure being a subset of the specified client data object or the specified server data object;

receive one or more modifications to the structure of server data objects in response to a server operation,
determine, at the processor, whether to transmit the object level update type command or the sub-structure level update type command based on a predefined criteria and transmission requirements of the one or more modifications to the structure of server data objects; and
transmit, based on the determination, an update command of either the object level update type or the sub-structure level update type to update the structure of client data objects with the modifications to the structure of server data objects.

9. A computer program product, tangibly embodied in a computer-readable hardware medium, the computer program product comprising instructions for causing a processor to:
receive, at the processor, one or more modifications to a structure of client data objects;
transmit, from the processor, a data object update command to a server, the data object update command for updating a structure of server data objects with the modifications to the structure of client data objects, the server data objects and the structure of server data objects being managed through an implementation of a predefined application programming interface that implements at least two types of data object update commands, wherein the two types of data object update commands are:

an object level update type for performing bidirectional updates between the server data objects and the client data objects for updating an entire specified client data object or an entire specified server data object; and a sub-structure level update type for performing bidirectional updates between the server data objects and the client data objects for updating a sub-structure of a specified client data object or a specified server data object, the sub-structure being a subset of the specified client data object or the specified server data object;

receive one or more modifications to the structure of server data objects in response to a server operation,
determine, at the processor, whether to transmit the object level update type command or the sub-structure level update type command based on a predefined criteria and transmission requirements of the one or more modifications to the structure of server data objects; and transmit, based on the determination, an update command of either the object level update type or the sub-structure level update type to update the structure of client data objects with the modifications to the structure of server data objects.

10. A method comprising:

receiving one or more modifications to a structure of server data objects; and transmitting a data object update command to a client, the data object update command for updating a structure of client data objects with the modifications to the structure of server data objects, the client data objects and the structure of client data objects being managed through an implementation of a predefined application programming interface that implements at least two types of data object update commands, wherein the two types of data object update commands are:

an object level update type for performing bidirectional updates between the server data objects and the client data objects for updating an entire specified client data object or an entire specified server data object; and a sub-structure level update type for performing bidirectional updates between the server data objects and the client data objects for updating a sub-structure of a specified client data object or a specified server data object, the sub-structure being a subset of the specified client data object or the specified server data object;

receive one or more modifications to the structure of server data objects in response to a server operation, determine, at the processor, whether to transmit the object level update type command or the sub-structure level update type command based on a predefined criteria and transmission requirements of the one or more modifications to the structure of server data objects; and transmit, based on the determination, an update command of either the object level update type or the sub-structure level update type to update the structure of client data objects with the modifications to the structure of server data objects.

11. A method comprising:

receiving one or more modifications to a structure of client data objects; and transmitting a data object update command to a server, the data object update command for updating a structure of server data objects with the modifications to the structure of client data objects, the server data objects and the structure of server data objects being managed through an implementation of a predefined application programming interface that implements at least two types of data object update commands, wherein the two types of data object update commands are:

an object level update type for performing bidirectional updates between the server data objects and the client data objects for updating an entire specified client data object or an entire specified server data object; and a sub-structure level update type for performing bidirectional updates between the server data objects and the client data objects for updating a sub-structure of a specified client data object or a specified server data object, the sub-structure being a subset of the specified client data object or the specified server data object; and receive one or more modifications to the structure of server data objects in response to a server operation, determine, at the processor, whether to transmit the object level update type command or the sub-structure level update type command based on a predefined criteria and transmission requirements of the one or more modifications to the structure of server data objects; and transmit, based on the determination, an update command of either the object level update type or the sub-structure level update type to update the structure of client data objects with the modifications to the structure of server data objects.

12. The computer-implemented hardware system of claim 1, wherein the client data objects are stored on the client.

13. The computer-implemented hardware system of claim 1 wherein the server data objects are stored on the server.

14. The computer-implemented hardware system of claim 1, wherein the sub-structure level update type is for replacing the sub-structure of the specified client data object or server data object.

15. The computer-implemented hardware system of claim 1, wherein the sub-structure level update type is for deleting the sub-structure of the specified client data object or server data object.

16. The computer-implemented hardware system of claim 1, wherein the sub-structure level update type is for merging the sub-structure of the specified client data object or server data object with another sub-structure.

17. The computer-implemented hardware system of claim 1, wherein the client and server determine whether to use the object level update type or the sub-structure level update type command based on a bandwidth required to transmit the data object update commands.

18. The computer-implemented hardware system of claim 1, wherein either an object level update command or a sub-structure level update command is selected as the command for a particular update based on a number of operations that must be performed to process the selected command.

19. The computer-implemented hardware system of claim 1, wherein either an object level update command or a sub-structure level update command is selected by the processor as the command for a particular update based on a number of operations that must be performed to produce the selected update.

* * * * *